Figures 3, 4, 19, 20, 21:
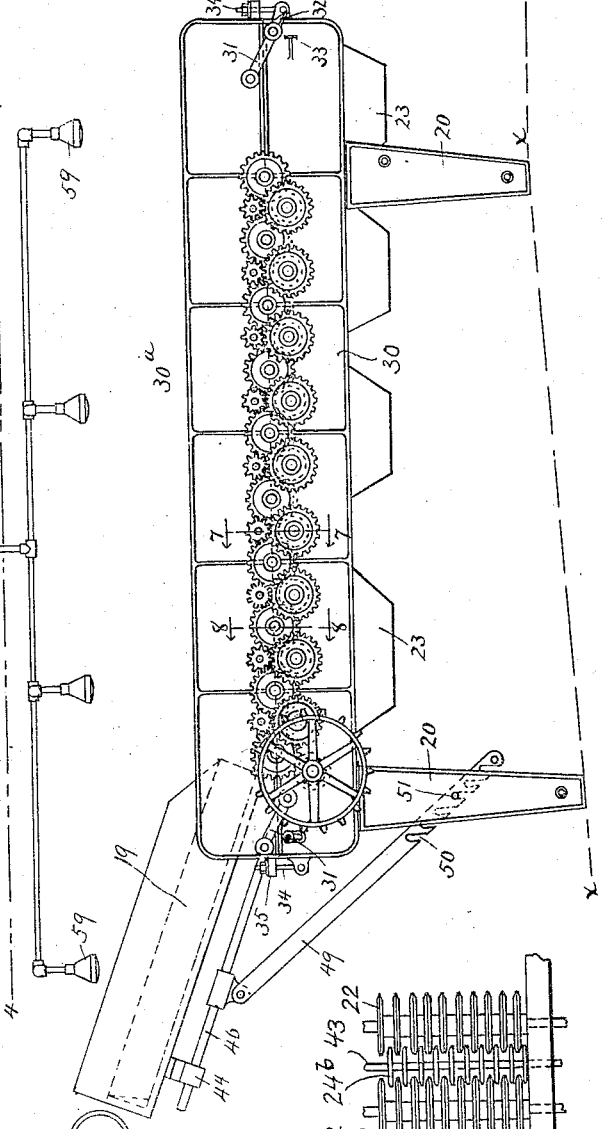

H. B. RITCHIE.
ASSORTING OR GRADING MACHINE.
APPLICATION FILED FEB. 9, 1916.
1,200,241.
Patented Oct. 3, 1916.
4 SHEETS—SHEET 1.
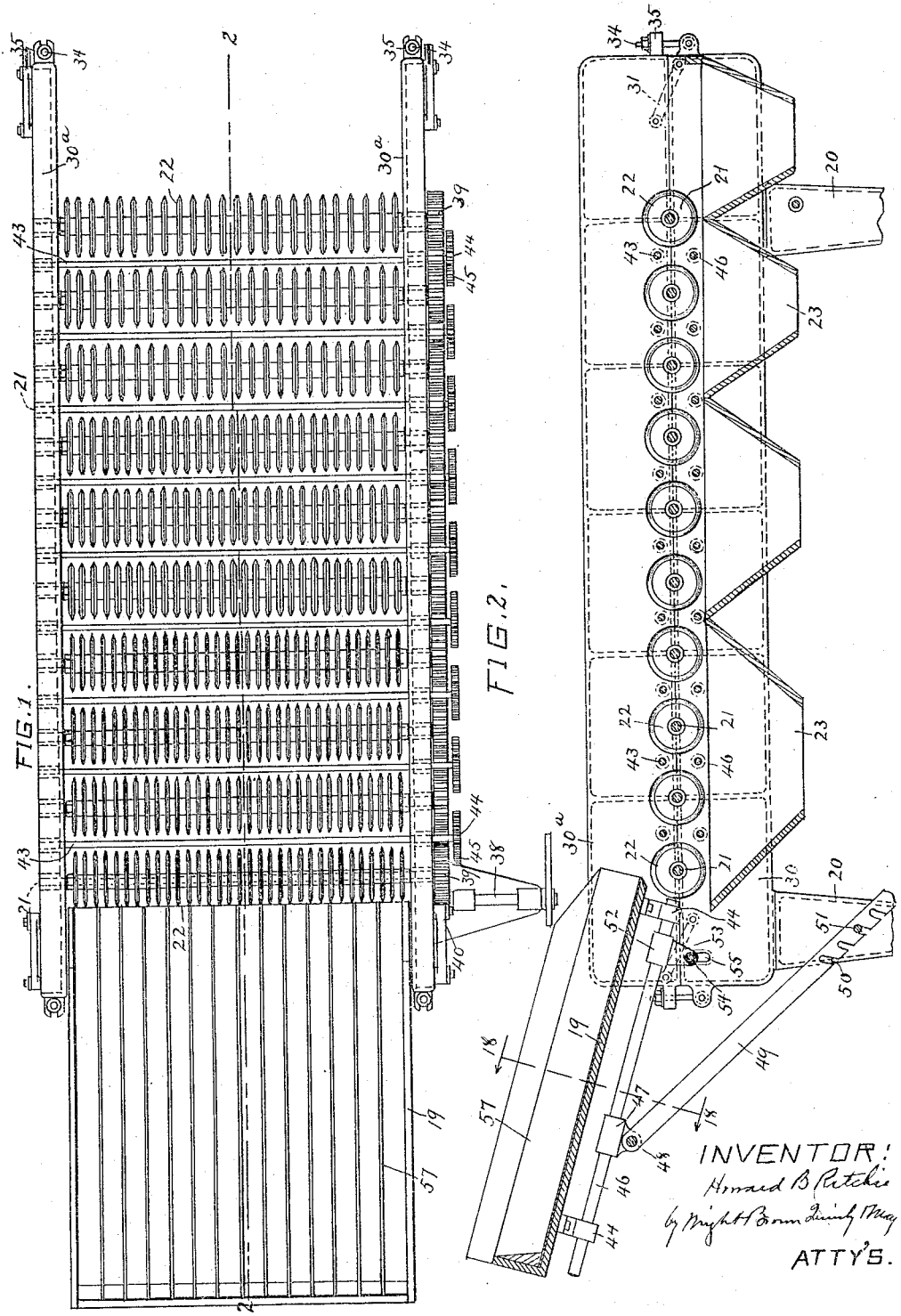
INVENTOR:
Howard B Ritchie
by Wright Brown Quinby May
ATTY'S.

H. B. RITCHIE.
ASSORTING OR GRADING MACHINE.
APPLICATION FILED FEB. 9, 1916.

1,200,241.

Patented Oct. 3, 1916.
4 SHEETS—SHEET 2.

INVENTOR:
Howard B. Ritchie
by Wright Brown Quimby May
ATTYS.

H. B. RITCHIE.
ASSORTING OR GRADING MACHINE.
APPLICATION FILED FEB. 9, 1916.
1,200,241.
Patented Oct. 3, 1916.
4 SHEETS—SHEET 3.
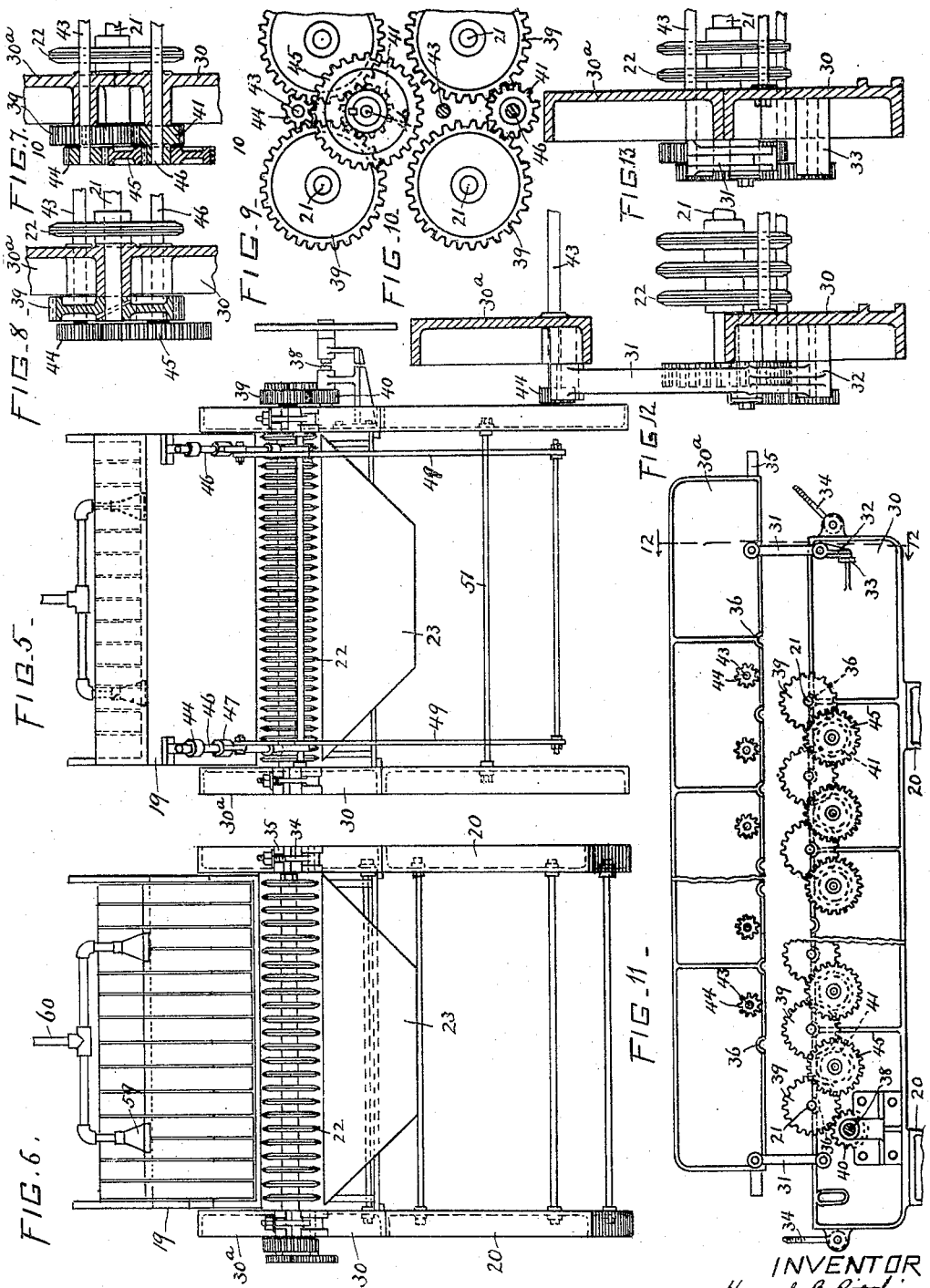
INVENTOR
Howard B. Ritchie
by Wright Brown Quinby May
ATTYS.

H. B. RITCHIE.
ASSORTING OR GRADING MACHINE.
APPLICATION FILED FEB. 9, 1916.
1,200,241.
Patented Oct. 3, 1916.
4 SHEETS—SHEET 4.
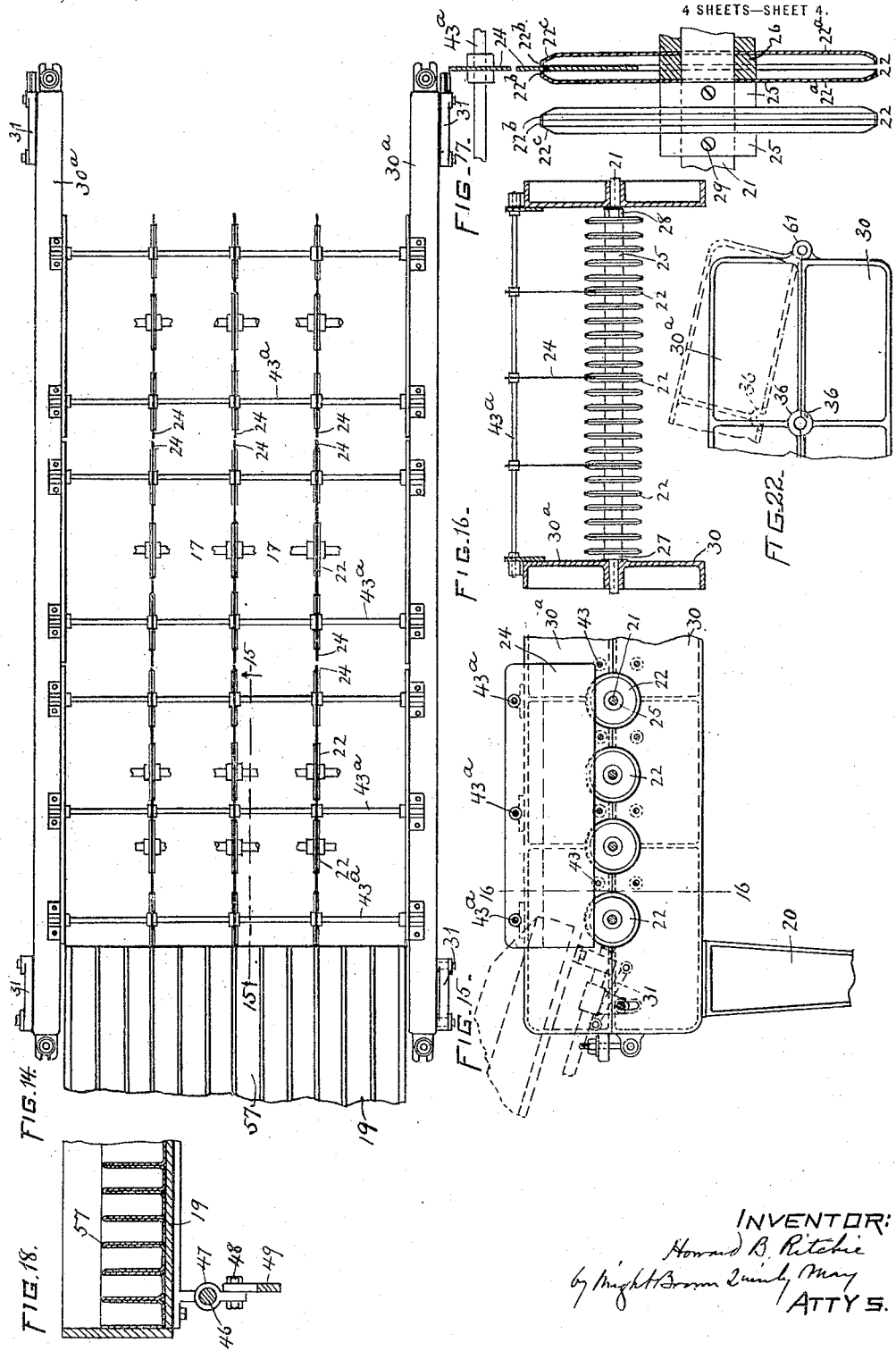
INVENTOR:
Howard B. Ritchie
by Wright Brown Quinby May
ATTYS.

UNITED STATES PATENT OFFICE.

HOWARD B. RITCHIE, OF BOSTON, MASSACHUSETTS.

ASSORTING OR GRADING MACHINE.

1,200,241. Specification of Letters Patent. Patented Oct. 3, 1916.

Application filed February 9, 1916. Serial No. 77,196.

*To all whom it may concern:*

Be it known that I, HOWARD B. RITCHIE, a citizen of the United States, residing at Boston, in the county of Suffolk and State of Massachusetts, have invented new and useful Improvements in Assorting or Grading Machines, of which the following is a specification.

This invention relates to machines of the character shown by Letters Patent of the United States, No. 1,119,454, granted to me December 1, 1914, said machine having disks provided with blunt-edged peripheries, the sides of which are beveled, and means for guiding elongated articles, such as fish, to the disks endwise in parallel relationship.

The general object of the invention is to provide an improved machine adapted to assort or guide large masses or quantities of fish and deliver the different sizes in segregated lots, without liability of the fish becoming clogged to interrupt the operation of the machine.

The invention is embodied in the improvements hereinafter described and claimed.

Of the accompanying drawings forming a part of this specification: Figure 1 represents a top plan view of my improved machine; Fig. 2 represents a longitudinal section on line 2—2 of Fig. 1; Fig. 3 represents a side view of the machine and water-supplying means above the same; Fig. 4 represents a plan view of the water-supplying means below the line 4—4 of Fig. 3; Figs. 5 and 6 represent elevations of opposite ends of the machine; Fig. 7 represents a section on line 7—7 of Fig. 3; Fig. 8 represents a section on line 8—8 of Fig. 3; Fig. 9 represents an enlargement of portions of the gearing shown by Fig. 3; Fig. 10 represents a section on line 10—10 of Fig. 7; Fig. 11 represents a side elevation of the machine, showing the upper portion of the frame elevated; Fig. 12 represents a section on line 12—12 of Fig. 11; Fig. 13 represents a view similar to Fig. 12, showing the upper portion of the frame in its normal position; Fig. 14 represents a top plan view of the machine, omitting certain parts and representing other parts not shown by the preceding figures; Fig. 15 represents a section on line 15—15 of Fig. 14; Fig. 16 represents a section on line 16—16 of Fig. 15; Fig. 17 represents a section on line 17—17 of Fig. 14; Fig. 18 represents a section on line 18—18 of Fig. 2; Fig. 19 represents a view similar to a portion of Fig. 15, showing a modification; Fig. 20 represents a view similar to Fig. 19, showing another modification; Fig. 21 represents a top plan view of the portion of the machine represented by Fig. 20; Fig. 22 represents a view similar to a portion of Fig. 3, showing another modification.

The same reference characters indicate the same or similar parts in all the views.

The machine comprises an elongated frame composed of spaced-apart side portions, the preferred construction of which is hereinafter described, said side portions being supported by legs 20. At the receiving end of the machine is mounted an inclined feeding table 19, which delivers the fish endwise, head or tail first, to the sorting disks, the table and the means for adjustably supporting it being more fully described hereinafter. The side portions of the frame are provided with bearings for a series of parallel transverse shafts 21, all rotated in the same direction. On said shafts are mounted disks 22, which are adapted, as described in my former patent, to assort fish delivered at one end of the machine into grades, the graded or assorted fish dropping through chutes 23 attached to the frame into suitable receptacles. One of my present improvements relates to the construction of the disks 22, said disks having blunt-edged peripheries and beveled sides as heretofore.

As shown by Fig. 17, each disk is composed of two dished members pressed from sheet or plate metal, and centrally perforated to receive a shaft 21. Each disk member has a flat body portion, an annular flange $22^b$ and a beveled zone $22^c$ adjoining the flange. The flanges project oppositely and are formed to abut against each other, as shown at the left of Fig. 17, and form the blunt periphery of the disk. The beveled zones form beveled side portions of the disk adjoining the periphery thereof. When the supplemental guiding plates 24, shown by Figs. 14 to 17, are employed, the plates of some of the disks are spaced apart, as indicated at the right of Fig. 17, the blunt periphery being composed of two members separated by a space adapted to receive and laterally confine said plates. The disks are spaced from each other on the shaft by external washers 25, and the similar internal washers 26 are interposed between the members of each disk, the internal washers 26 in the disks, which are left open to receive the plates 24, being wider than the internal washers in the other disks.

Each shaft 21 is, or may be, provided near one end with a fixed collar 27 and near the opposite end with a nut 28 (Fig. 16) engaged with a threaded portion of the shaft. The disks and washers strung alternately on the shaft and the central portions of the disk members are clamped between the collar 27 and nuts 28, by the tightening of the nut, the outer acting portions of the disk members being therefore readily supported and secured to the shaft. If desired, the washers 25 may be secured to the shaft by set screws 29.

As shown by Fig. 1, the disks are differently spaced, the disks on the first four shafts at the left being in alinement and closest together. The disks on the next three shafts are spaced in alinement, but wider apart, while the disks on the next three shafts, which are also in alinement, are spaced still farther apart. This spacing accords substantially with that shown by my former patent, and provides for the assorting of fish by permitting the smallest fish to drop between the disks having the narrowest spacing, the largest fish to drop between the disks having the widest spacing, and the fish of intermediate size to drop between the disks having the intermediate spacing.

Another improvement relates to the construction of the side portions 19 of the supporting frame containing the bearing for the shafts 21, and this improvement has for its object to provide divided bearings for said shafts 21 and enable said bearings to be opened so that the shafts may be conveniently removed for the purpose of varying the spacing of the disks thereon or the sizes of the disks. Each of said side portions is composed of a fixed lower member 30 and a movable upper member 30ª, said members being connected by hinge connections formed by links 31 pivoted to the members and arranged to support the upper member separated from the lower member, as shown by Figs. 11 and 12, and to permit the opposed edges of said members to meet, as shown by Figs. 3 and 13. One of said links is provided with a stop arm 32 which abuts against a stop ear 33 on the lower member 30, as shown by Fig. 11, when the upper member is raised. When the upper member is lowered it is confined by the engagement of swinging clamping bolts 34 pivoted to the lower member, with slotted ears 35 on the upper member.

The meeting edges of the members 30 and 30ª are provided with recesses 36 (Fig. 11) which coincide when the upper member is lowered and form divided bearings for the shafts 21. The shafts are therefore freely removable from their bearings when the upper frame members are raised. Said members are confined in their raised positions with sufficient stability by the links 31 and the stop parts 32 and 33 when the links are vertical, and are easily moved both to their raised and their lowered positions.

The shafts 21 are rotated by power communicated from a driving shaft 38 through a suitable train of gearing including gears 39 fast on the shafts 21, a gear 40 (Fig. 11) fast on the driving shaft and meshing with the gear 39 on the first shaft 21 of the series, and intermediate gears 41 connecting the shaft gears 39, the gears 39 and 41 forming a continuous train causing the simultaneous rotation of all the shafts 21 in the same direction.

Another improvement relates to means for preventing fish from moving endwise downwardly between disks on adjacent shafts and becoming jammed between said disks. This improvement is embodied in rotary rods or rollers 43 of small diameter, journaled in bearings in the upper frame members 30ª, and extending parallel with the shafts 21 somewhat below the highest portions of the disks 22. The rods are in staggered relation to the shafts, so that there is a rod above the space between the disks on each shaft 21 and the next. Said rollers are provided with gears 44 meshing with roller-rotating gears 45 on shafts 46, which are journaled in the frame members 30 and are fast to the intermediate gears 41. The shafts 46 are therefore rotated by the said intermediate gears and impart rotation through the gears 45 and 44 to the rollers 43.

Fish too large to drop between the disks of any shaft and moving endwise toward the disks of the next shaft are prevented from tipping downwardly at their forward ends into the spaces between the disks of the adjacent shafts, and therefore from being wedged between and injured by the blunt peripheries of the adjacent disks. When the upper frame members are raised the roller gears 43 are separated from the gears 45, and are caused to mesh with the latter when the upper frame members are lowered and operatively related to the lower frame members.

It is important that the fish move endwise either head or tail first while being assorted, and they are presented thus arranged to the disks by the feeding table.

To prevent liability of the fish swinging crosswise of the disks, after they leave the feeding table 19, is the object of another of my improvements which is embodied in the supplemental longitudinal ribs, formed by the above-mentioned plates 24. Said plates are vertically arranged over the disks 22 and extend at right angles with the shafts 21. They are supported by transverse rods 43ª (Figs. 14 to 17) attached to the upper frame members 30ª. The lower edges of the plates 24 enter the slots or openings between the disk members 22ª, which are spaced apart, as shown at the right of Fig. 17, and are therefore laterally supported by said spaced members, their lower edges being at the same time located below the highest portions of the disks.

I have shown three series of plates 24, those of one series coöperating with the disks having the closest spacing, those of another series coöperating with the disks having the widest spacing, and those of the intermediate series coöperating with the disks having the intermediate spacing.

The feeding table 19 comprises a wooden hopper or chute, the bottom of which has downwardly projecting brackets 44 (Figs. 2 and 5) which are perforated to receive rods 46 extending lengthwise of and parallel with said bottom, the rod being secured to the brackets by set-screws or otherwise. To the rods 46 are secured collars 47 having ears to which are pivoted at 48 braces or struts 49, having notches 50 engaged with a transverse rod 51 extending between two of the legs 20, there being a series of notches permitting the inclination of the table 19 to be varied. The rods 46 are provided with collars 52 having ears 53 engaging a transverse rod 54, the ends of which project into orifices 55 in the lower frame members 30. The rod 54 and orifices 55 constitute a hinge connection between the table and the frame, permitting the table to stand at various inclinations.

To the bottom of the table are attached vertical ribs 57 (Figs. 14 and 18) formed by bending a sheet metal piece covering the wooden bottom, said ribs extending lengthwise of the table and causing fish dropped thereon to move endwise to the sorting disks.

Water is supplied to the feeding table and at various points over the sorting disks by a series of sprinkler heads 59 connected with a supply pipe 60 by a system of piping, as shown by Figs. 3 and 4.

Fish bodies delivered to the machine are, in many cases, partially dried, so that they are not in the slippery or slimy condition which is desirable to facilitate their progress through the machine, the contact of the partially dried surfaces with the guiding means developing friction which reduces the rapidity of movement of the bodies. Although the assorting disks 22, and rods 43 forming members of the guiding means, rotate in the direction required to feed the bodies forward, the surface velocity of the rods 43 is less than that of the peripheries of the disks. The guiding ribs 24 being fixed have no feeding action. The fish bodies when relatively dry are therefore retarded by said rods and guiding ribs.

The water supplied by the sprinkler heads 59 and uniformly distributed thereby over the fish bodies moving over the machine lubricates the surfaces of the bodies and renders them suitably slippery so that the movement of the bodies is not retarded by frictional contact with the guiding means.

The frame and the series of disks may be inclined relatively to the floor, as indicated by Fig. 3, the line $x$—$x$ representing the floor level.

The plates or supplemental guiding ribs 24 may have slots 24ª in their lower edges to receive the rods 43, said slots permitting the lower edges of the supplemental ribs 24 to be located lower than said rods.

Discoidal supplemental guiding ribs 24ᵇ may be substituted for the fixed plates or ribs 24, as shown by Figs. 20 and 21, said discoidal ribs being attached to the rods 43.

The upper frame members 30ª, instead of being connected with the lower members 30 by hinge connections formed by the swinging links 31, may be connected with the lower members at one end of the machine by hinges 61, composed of socket and pintle portions, as indicated by Fig. 22, the members 30ª being adapted to be swung upwardly on said hinges, as shown by dotted lines.

Each of the hinge connections shown permits a limited displacement of the upper frame members without complete separation thereof from the base portion of the frame, and insures the accurate return of the displaced members to their operative position.

Having described my invention, I claim:

1. An assorting machine having parallel rotary shafts, disks mounted thereon, each composed of two sheet metal members having flat body portions, oppositely projecting annular flanges, and beveled zones, said members collectively forming a disk having a blunt periphery formed by said flanges, and beveled portions formed by said zones between said periphery and the body portions, and means for detachably securing the members on the shafts.

2. An assorting machine having parallel rotary shafts, disks mounted thereon, each composed of two dished members collectively forming a disk provided with blunt-edged peripheries, the sides of which are beveled, internal washers interposed between said members, external spacing washers interposed between adjacent disks, and means on the shafts for clamping the said disk members and washers together.

3. An assorting machine having parallel rotary shafts, disks mounted thereon, each composed of two dished members collectively forming a disk provided with blunt-edged peripheries, the sides of which are beveled, means for detachably securing said members spaced apart on said shaft, the members of some of said disks being spaced apart, guiding ribs located above the shafts and extending at right angles therewith, the lower edges of said ribs projecting into the spaces between adjacent disk members, and means for securing said ribs.

4. An assorting machine having parallel rotary shafts, spaced-apart sorting disks mounted thereon, and guiding rods parallel with said shafts and in staggered relation thereto, said rods being lower than the highest portions of the disks and located over the spaces between the disks on adjacent shafts to prevent articles from being jammed between said disks.

5. An assorting machine having parallel rotary shafts, sorting disks mounted thereon, guiding rods parallel with said shafts and located over the spaces between the disks on adjacent shafts, and means for simultaneously rotating the said shafts and rods in the same direction.

6. An assorting machine comprising a supporting frame having longitudinal side portions, each composed of a fixed lower member and a displaceable upper member, the meeting edges of said members having recesses forming divided shaft bearings, shafts removably journaled in said bearings and provided with removably secured sorting disks, hinge connections between said members permitting a limited displacement of the upper members, a train of gearing for rotating said shafts including gears attached to the shafts and intermediate gears having shafts journaled in the lower frame members, and means for driving said train, the shaft gears being separable from the intermediate gears and the shafts removable from the bearings when the upper frame members are displaced.

7. An assorting machine comprising a supporting frame having longitudinal side portions, each composed of a fixed lower member and a displaceable upper member, the meeting edges of said members having recesses forming divided shaft bearings, hinge connections between said members permitting a limited displacement of the upper members, shafts journaled in said bearings and provided with removably secured sorting disks, gears attached to said shafts, intermediate gears meshing with the shaft gears, and having shafts journaled in bearings in the lower frame members, rod-rotating gears secured to said intermediate gears, and guiding rods journaled in said upper frame members and movable therewith, said rods having gears which mesh with said rod-rotating gears when the frame members are operatively related, and the gears on the rods being separable from the rod-rotating gears by the displacement of the upper frame members, and the gears on the shafts being separable from the intermediate gears on the lower frame members when the upper frame members are displaced.

8. An assorting machine comprising an elongated frame, transverse shafts journaled thereon and provided with sorting disks, a feeding table adjustably connected with one end of the frame and provided with longitudinal guiding ribs, and supplemental guiding ribs supported by the frame in alinement with ribs on the table, the lower edges of the supplemental ribs projecting below the highest portions of the disks.

9. An assorting machine comprising an elongated frame, transverse shafts journaled thereon and provided with sorting disks, means for feeding articles to be sorted to one end of the frame, guiding ribs having vertical sides located over the frame, and means for supporting said ribs with their lower edges projecting below the highest portions of the disks.

In testimony whereof I have affixed my signature.

HOWARD B. RITCHIE.

Copies of this patent may be obtained for five cents each, by addressing the "Commissioner of Patents, Washington, D. C."